(12) United States Patent
Kandula et al.

(10) Patent No.: US 11,429,430 B2
(45) Date of Patent: Aug. 30, 2022

(54) MIGRATION AS A SERVICE-BASED APPLICATIONS MIGRATION

(71) Applicant: VMWARE, INC., Palo Alto, CA (US)

(72) Inventors: Srinivas Kandula, Bangalore (IN);
Gaurav Gupta, Bangalore (IN);
Arunvijai Sridharan, Bangalore (IN);
Vibhu Rastogi, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 412 days.

(21) Appl. No.: 16/137,564

(22) Filed: Sep. 21, 2018

(65) Prior Publication Data

US 2020/0034192 A1 Jan. 30, 2020

(30) Foreign Application Priority Data

Jul. 24, 2018 (IN) .............................. 201841027810

(51) Int. Cl.
*G06F 9/48* (2006.01)
*G06F 9/54* (2006.01)

(52) U.S. Cl.
CPC ............ *G06F 9/4856* (2013.01); *G06F 9/546* (2013.01)

(58) Field of Classification Search
CPC ................................ G06F 9/546; G06F 9/4856
See application file for complete search history.

(56) References Cited

U.S. PATENT DOCUMENTS

| 2013/0246623 A1* | 9/2013 | Seth ...................... H04L 47/783 |
| | | 709/226 |
| 2014/0372533 A1* | 12/2014 | Fu .......................... G06F 9/5072 |
| | | 709/204 |
| 2017/0134519 A1* | 5/2017 | Chen ...................... H04L 67/10 |
| 2018/0293017 A1* | 10/2018 | Curley ................ G06F 11/2092 |

* cited by examiner

*Primary Examiner* — Charles E Anya

(57) ABSTRACT

In one example, a request to migrate an application running on a first compute node to a second compute node with a change in a version of the application may be received. Migration information may be provided to a cloud-based Migration as a Service provider based on the request. An application migration component may be received from the cloud-based Migration as a Service provider based on the migration information. Further, the application migration component may be executed to migrate the application from the first compute node to the second compute node with the change in the version of the application.

21 Claims, 4 Drawing Sheets

MIGRATION AS A SERVICE-BASED APPLICATIONS MIGRATION

RELATED APPLICATIONS

Benefit is claimed under 35 U.S.C. 119(a)-(d) to Foreign Application Serial No. 201841027810 filed in India entitled "MIGRATION AS A SERVICE-BASED APPLICATIONS MIGRATION", on Jul. 24, 2018, by VMware, Inc., which is herein incorporated in its entirety by reference for all purposes.

The present application (Attorney Docket No. E136.02) is related in subject matter to U.S. patent application Ser. No. 16/137,554 (Attorney Docket No. E136.01), which is incorporated herein by reference.

TECHNICAL FIELD

The present disclosure relates to computing environments, and more particularly to methods, techniques, and systems to migrate applications between compute nodes using a cloud-based Migration as a Service (MaaS).

BACKGROUND

As computing environments (e.g., cloud computing environments, server-client computing environment, and the like) have grown in popularity and capability, there has been a proliferation of applications to perform tasks or operations. Applications are often referred as productivity programs or end-user programs as the applications may enable the user to complete tasks. An application can be a server application or a client application executing on a compute node (e.g., a physical machine, a virtual machine, a container, and/or the like). Further, applications or services may be modified and deployed to improve customer experience, to add new features, to solve security issues, and the like.

The modifications or improvements made in the application may reflect changes in binary files associated with the application. Further, the modifications may have to be deployed via a different version of the application. To incorporate the modifications, the application may need to be upgraded to a corresponding version. In some cases, the application running on one compute node may need to be migrated to a different compute node, for instance, to support the modifications incorporated in the upgraded version.

Figure 1A:
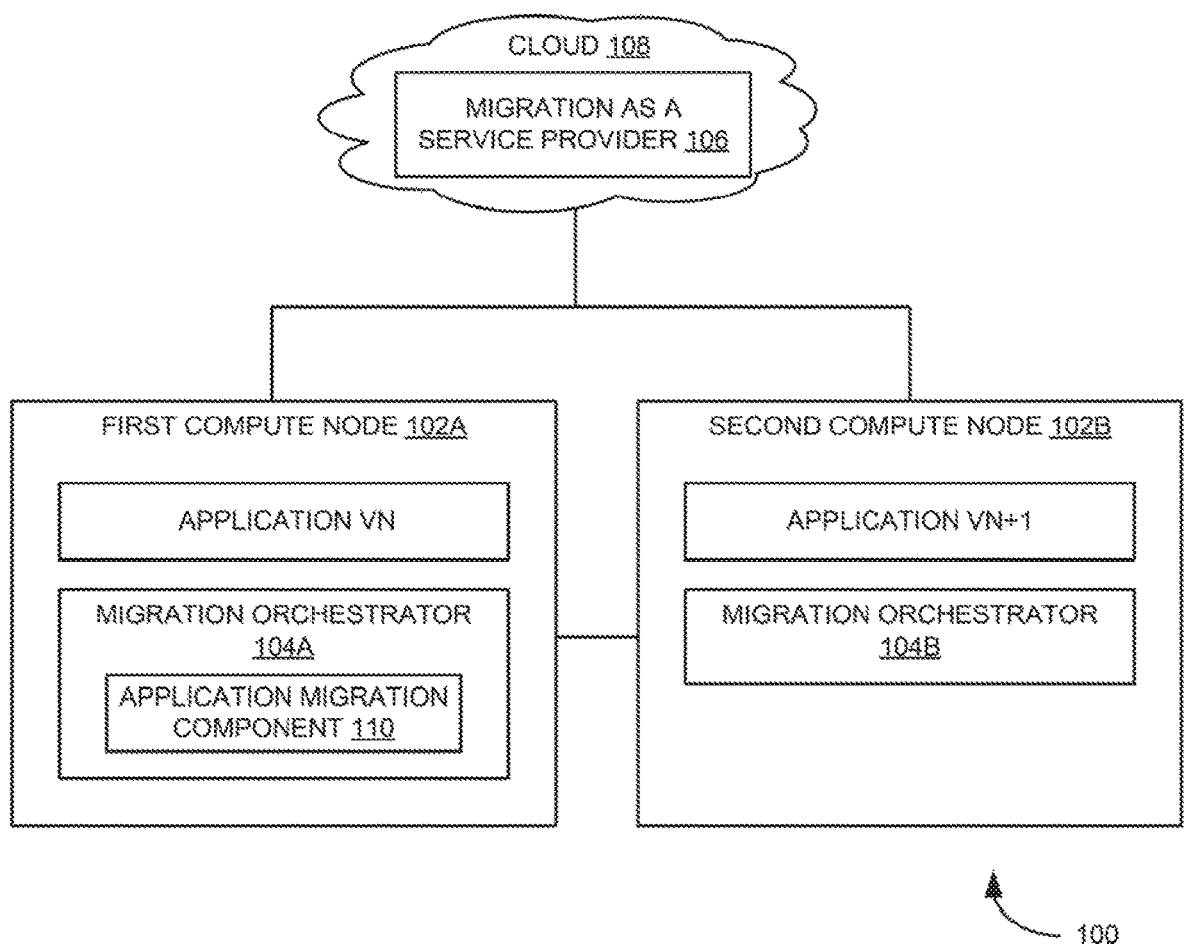
FIG. 1A is a system view of an example computing environment illustrating migration of an application between compute nodes using a cloud-based Migration as a Service (MaaS)

The drawings described herein are for illustration purposes only and are not intended to limit the scope of the present subject matter in any way.

DETAILED DESCRIPTION

Examples described herein may provide an enhanced computer-based and network-based method, technique, and system to migrate applications between compute nodes using Migration as a Service (MaaS). In cloud computing environments, application/operating system (OS) monitoring environments, or client-server computing environments, different applications may be running on different compute nodes (e.g., a physical computing machine, a virtual machine, a container, and/or the like). The applications may be server applications, client applications, and/or stand-alone applications. For example, a client may send a service request to a server through a client application. A server application in the server may process the service request and respond with the result. Further, the client application may collect metrics from underlying operating system (OS) and/or services on the client, consolidate the metrics to generate consolidated data, and reports the consolidated data to the server for storage and analysis. Stand-alone applications may refer to applications that do not come bundled with, or require, another software package in order to run. In other words, if an application does not need to interact with any other applications, then the application can be referred to as the stand-alone application with its own exclusive local service deployment.

In such a computing environment, there can be multiple software components involved for executing an application running on a compute node. To improve customer experience, modifications may have to be made to the application via an upgraded version of the application, for instance, to include new features, solve security issues, and the like. Further, the application associated with the compute node may have to be migrated to another compute node (e.g., an upgraded compute node) with the upgraded version, for instance, to incorporate the modifications made to the application. Migration of the application may refer to a process of transferring data, configuration, and software binaries from one version to another version between the compute nodes.

Some methods for migrating the application between the compute nodes may include migrating the application between the compute nodes manually. The migration of the application between the compute nodes may include complex process or sequence of steps that a skilled person may have to perform manually in different phases such as production, testing, development, and performance of the application. Therefore, migrating the application manually may not be feasible.

Examples described herein may migrate an application between compute nodes using a cloud-based MaaS and a migration orchestrator service. Examples described herein may receive a request to migrate an application running on a first compute node to a second compute node with a change in a version of the application, provide migration information to a cloud-based MaaS provider based on the request, receive an application migration component from the cloud-based MaaS provider based on the migration information, and execute the application migration component to migrate the application from the first compute node to the second compute node with the change in the version of the application.

System Overview and Examples of Operation

FIG. 1A is a system view of an example computing environment 100 illustrating a migration of an application between compute nodes (e.g., a first compute node 102A and a second compute node 102B) using a cloud-based MaaS. As shown in FIG. 1A, computing environment 100 may include first compute node 102A and a MaaS provider 106 in a cloud 108 that are in communication over network(s). Example network can be a managed Internet protocol (IP) network administered by a service provider. For example, network may be implemented using wireless protocols and technologies, such as WiFi, WiMax, and the like. In other examples, network can also be a packet-switched network such as a local area network, wide area network, metropolitan area network, Internet network, or other similar types of network environment. In yet other examples, network may be a fixed wireless network, a wireless local area network (LAN), a wireless wide area network (WAN), a personal area network (PAN), a virtual private network (VPN), intranet or other suitable network system and includes equipment for receiving and transmitting signals.

Each compute node (e.g., first compute node 102A and second compute node 102B) may refer to a computing device or computer program (i.e., executing on a computing device) that requests migration services from MaaS provider 106 in cloud 108. Further, the application may be a server application, a client application, or a stand-alone application running on compute node 102A. Compute nodes (e.g., compute node 102A and 102B) may include, but are not limited to, physical machines, virtual machines, containers, and the like. The virtual machines, in some examples, may operate with their own guest operating systems on the computing device using resources of the computing device virtualized by virtualization software (e.g., a hypervisor, virtual machine monitor, and the like). A container is a data computer node that runs on top of a host operating system without the need for a hypervisor or separate operating system.

In some examples, the compute nodes (e.g., first compute node 102A and second compute node 102B) may include processing resources/processors and memories, respectively. Example processor can be any custom made or commercially available processor, a central processing unit (CPU), an auxiliary processor among several processors associated with the compute nodes (e.g., first compute node 102A and second compute node 102B), a semiconductor-based microprocessor (in the form of a microchip or chip set, for example), a macroprocessor, or generally any device for executing computer-readable program code. Example memory may be a computer-readable storage medium. In some examples, memory can have a distributed architecture, where various components are situated remote from one another, but can be accessed by the compute nodes (e.g., first compute node 102A and second compute node 102B). Processors may be configured to execute software stored within associated one of memories, to communicate data to and from the memory, and to generally control operations of compute nodes (e.g., first compute node 102A and second compute node 102B) pursuant to the computer-readable program code. Example non-transitory computer readable medium is an electronic, magnetic, optical, or other physical device or means that can contain or store a computer program for use by or in connection with a computer related system. The computer-readable program code in the non-transitory computer-readable medium may include one or more separate programs and may be in the form of a source program, executable program (object code), script, or any other entity comprising a set of instructions to be performed.

For example, computing environment 100 may be a client-server computing environment, in which a server may communicate with multiple clients (e.g., physical computing devices) through server and client applications. In other examples, computing environment 100 may be operated by a cloud computing service provider and exposed as a service available to tenants (e.g., account holders), such as enterprises. Example cloud computing platform may include, but not limited to, Amazon Web Services (AWS), Google Cloud Platform, Windows Azure, OpenStack, or any other cloud computing platform. Further, computing environment 100 may be configured to dynamically provide an enterprise or users with one or more virtual data centers in which a user may provision VMs, containers, and/or deploy multi-tier applications.

Further, numerous types of applications may be supported on computing environment 100. For example, computing environment 100 may include a plurality of applications running on the compute nodes. For example, first compute node 102A may include application VN running on first compute node 102A, where VN refers to a version number of the application. The version number may be specified to track and control modifications made to the application. Examples described in FIG. 1A may depict first compute node 102A and second compute node 102B, however, in some examples, a group of compute node may be included in computing environment 100 to run different applications.

In one example, first compute node 102A may include a migration orchestrator 104A. Migration orchestrator 104A may facilitate the migration of application VN from first compute node 102A to second compute node 102B. For example, when an upgraded version (e.g., application VN+1) of application VN is available, migration orchestrator 104A may automate migration of the application VN between the compute nodes (e.g., from first compute node 102A to second compute node 102B) with an upgraded version (e.g., application VN+1) using cloud-based MaaS. In some examples, migration orchestrator 104A may reside in application VN or may reside as a separate component in first compute node 102A and communicate with application VN. Migration orchestrator 104A may run as an on-demand service in first compute node 102A.

Further, MaaS provider 106 in cloud 108 may provide the MaaS on demand. Cloud 108 may deliver information technology (IT) services in which resources are retrieved from the Internet through web-based tools and applications. MaaS may be referred as a software distribution model in which a third-party provider hosts components for migration of application VN between the compute nodes (e.g., from first compute node 102A to second compute node 102B) with the upgraded version (e.g., application VN+1). MaaS provider 106 may make the components available to the compute node (e.g., first compute node 102A and second compute node 102B) over the network (e.g., Internet). MaaS provider 106 may be implemented as engines or modules including any combination of hardware and programming to implement the functionalities described herein. The functions of MaaS provider 106 may also be implemented by a respective processor.

During operation, migration orchestrator 104A may receive a request to migrate application VN running on first compute node 102A to second compute node 102B with a change in the version (e.g., application VN+1) of application VN. For example, the request to migrate may be triggered by an administrator of first compute node 102A. Further, migration orchestrator 104A may provide migration information to MaaS provider 106 in cloud 108 based on the request. In one example, the migration information may include configuration details associated with first compute node 102A, configuration details associated with second compute node 102B, and version details of the application (e.g., VN and VN+1).

Migration orchestrator 104A may receive an application migration component 110 from MaaS provider 106 based on the migration information. In one example, MaaS provider 106 may receive the migration information from migration orchestrator 104A and validate the received migration information. For example, validation of migration information may include determining compatibility, checking versions, and so on to provide application migration component 110. Upon successful validation of the migration information, MaaS provider 106 may provide application migration component 110 to migration orchestrator 104A. In one example, migration orchestrator 104A may receive application migration component 110 as a service from MaaS provider 106. Upon receiving application migration component 110 from MaaS provider 106, migration orchestrator 104A may load application migration component 110 on first compute node 102A. In some examples, migration orchestrator 104A may load application migration component 110 into a process of application VN.

In one example, migration orchestrator 104A may execute application migration component 110 to migrate application VN from first compute node 102A to second compute node 102B with the change in the version (e.g., application VN+1) of application VN. Migrating application VN between first compute node 102A and second compute node 102B using application migration component 110 is described in FIG. 1B.

In one example, prior to migration, application VN may run on first compute node 102A. Upon migration, application VN+1 may run on second compute node 102B. Further, second compute node 102B may include a migration orchestrator 104B to migrate application VN+1 to another version in future via communicating with MaaS provider 106 in cloud 108.

Figure 1B:
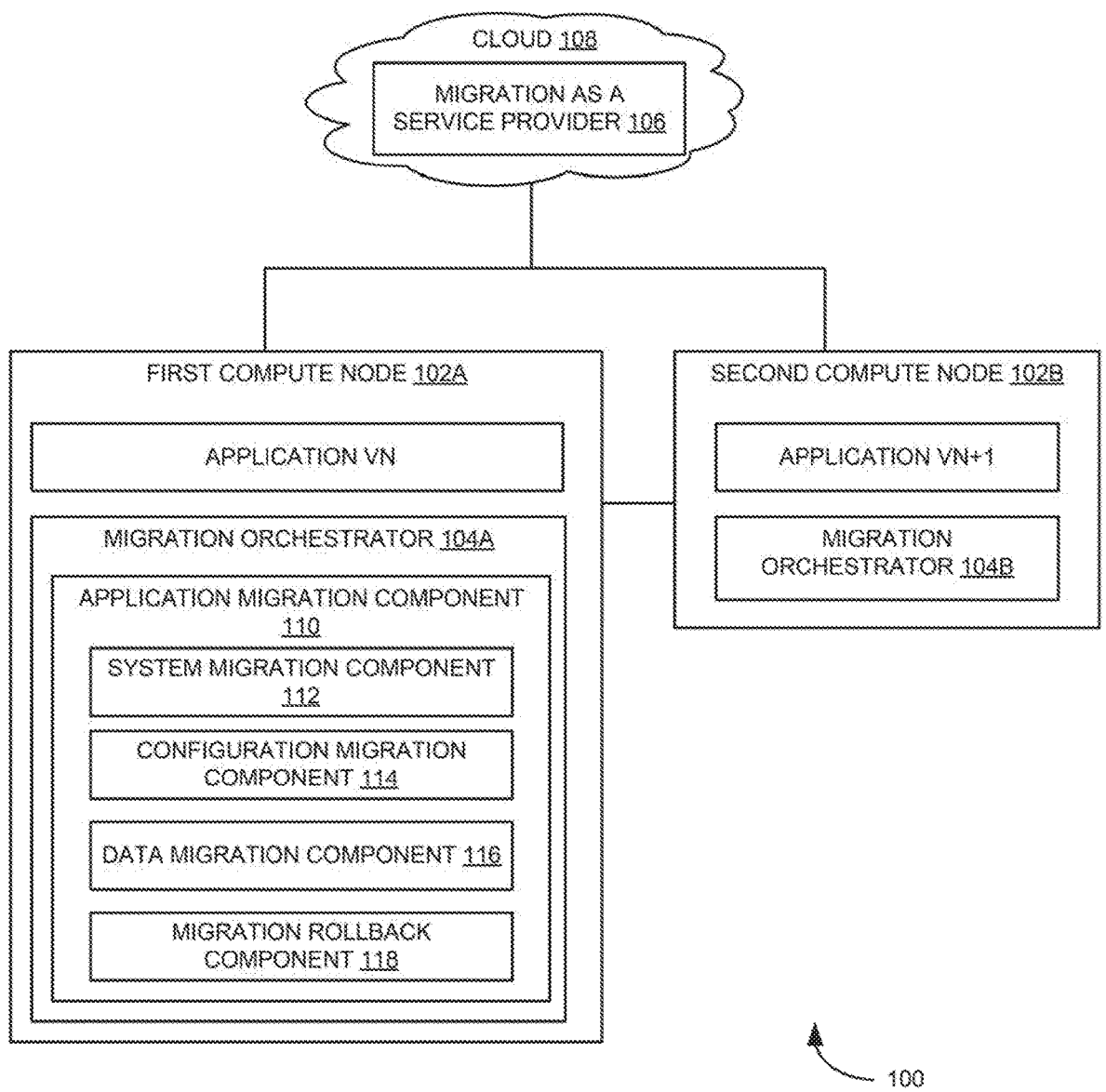
FIG. 1B is a system view of the example computing environment of FIG. 1A, depicting additional features of an application migration component.

FIG. 1B is a system view of example computing environment 100 of FIG. 1A, depicting additional features of application migration component 110. The structure and functionalities of the compute nodes (e.g., first compute node 102A and second compute node 102B) and MaaS provider 106 is described in FIG. 1'A. In one example, application migration component 110 may include migration helper binaries such as a system migration component 112, a configuration migration component 114, and a data migration component 116 to perform migration of the application from first compute node 102A to second compute node 102B with the change in the version (e.g., application VN+1) of the application VN.

During operation, system migration component 112 may download a binary file associated with a modified version (e.g., application VN+1) of application VN in first compute node 102A from MaaS provider 106. The binary file may include executable (e.g., ready-to-run) programs by a computing system. Upon downloading the binary file, system migration component 112 may deploy the binary file in second compute node 102B.

Configuration migration component 114 may migrate configuration data and/or custom configuration data (e.g., specific to first compute node 102A) associated with a first version VN of the application to the modified version VN+1 of the application between first compute node 102A and second compute node 102B. Configuration data may include operation parameters such as network port number, security settings, software drivers, and the like. During migration, configuration migration component 114 may copy the configuration data from first compute node 102A to second compute node 102B.

Data migration component 116 may provide seamless migration from the first version (e.g., application VN) to the modified version (e.g., application VN+1) based on configuration details. In one example, MaaS provider 106 may include compatibility or version mapping details of application VN and application VN+1 to provide the seamless migration from the first version VN to the modified version VN+1. For example, consider a current version of the application as VN and a target version of the application as VN+2 or VN+3. Based on current version VN and target version VN+2 or VN+3 of the application, MaaS provider 106 may provide data migration component 116 to migration orchestrator 104A to provide seamless migration from application version VN to application version VN+2 or application version VN+3. Thus, incremental migration may not be required to be performed manually. For example, consider the application is on version 4.8. When the application may have to be migrated to version 7.5, there may be no need to be migrated to intermediate versions and data migration component 116 may take care of intermediate steps to have seamless migration path.

In one example, application migration component 110 may include a migration rollback component 118. During failover of the migration process, migration rollback component 118 may rollback migration of application VN. Thus, in case of failover, migration rollback component 118 may clean up a new environment that is set because of unsuccessful migration (e.g., both compute nodes (e.g., first compute node 102A and second compute node 102B)). Thus, examples described herein may provide the cloud-based MaaS and an orchestrator service that work together in migrating applications with one version to another version and rollback when migration fails.

In some examples, the functionalities described herein, in relation to instructions to implement functions of migration orchestrator 104A, application migration component 110, and any additional instructions described herein in relation to the storage medium, may be implemented as engines or modules including any combination of hardware and programming to implement the functionalities of the modules or engines described herein. The functions of migration orchestrator 104A and application migration component 110 may also be implemented by a respective processor.

Example Processes

Figure 2:
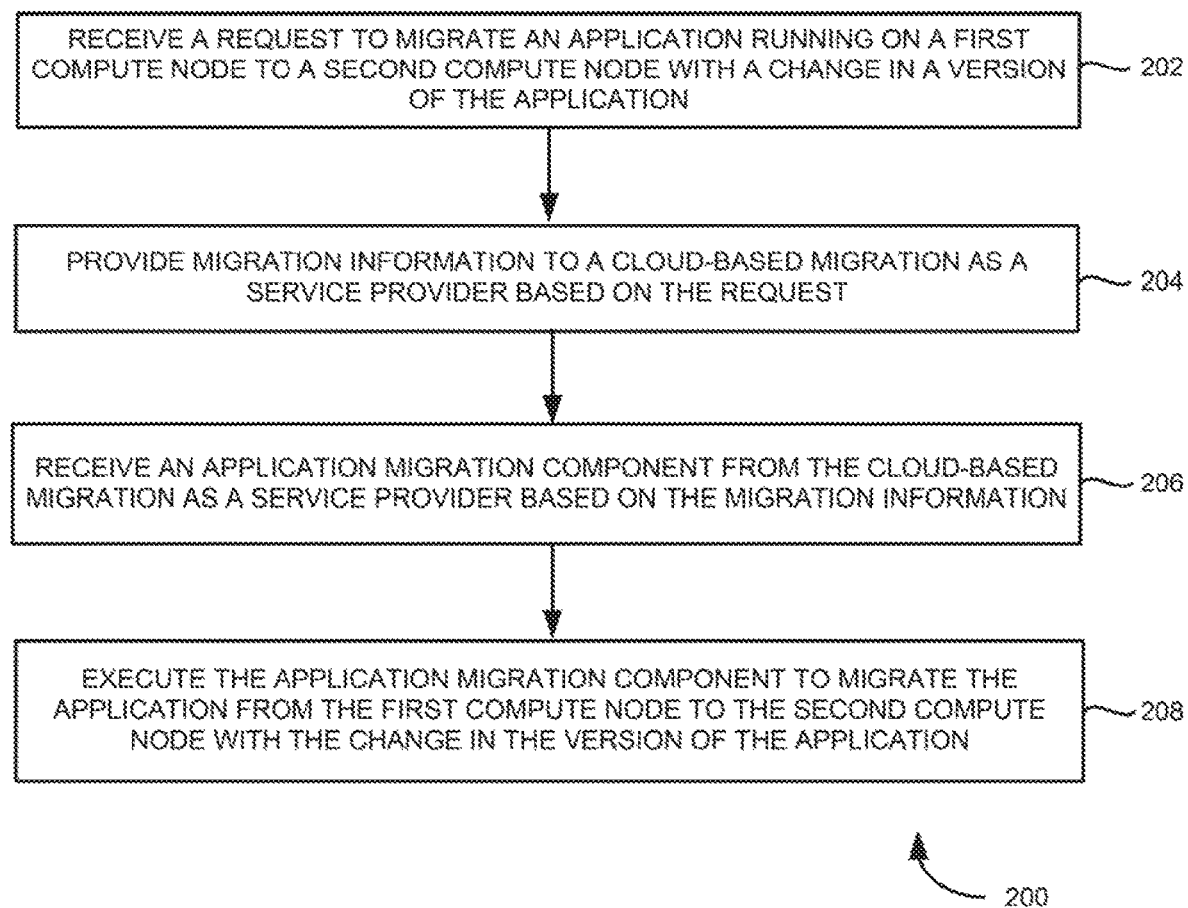
FIG. 2 is an example flow diagram illustrating migration of an application between compute nodes using a cloud-based MaaS.

FIG. 2 is an example flow diagram 200 illustrating migration of an application between compute nodes using a cloud-based MaaS in a computing environment. The process or method is performed as a MaaS. It should be understood that the process depicted in FIG. 2 represents generalized illustrations, and that other processes may be added, or existing processes may be removed, modified, or rearranged without departing from the scope and spirit of the present application. In addition, it should be understood that the processes may represent instructions stored on a computer-readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flow charts illustrate functional information to design/fabricate circuits, generate machine-readable instructions, or use a combination of hardware and machine-readable instructions to perform the illustrated processes.

At 202, a request to migrate the application running on a first compute node to a second compute node with a change in a version of the application may be received. At 204, migration information may be provided to a cloud-based MaaS provider by a migration orchestrator of the first compute node based on the request. At 206, an application migration component may be received by the migration orchestrator from the cloud-based MaaS provider based on the migration information.

At 208, the application migration component may be executed to migrate the application from the first compute node to the second compute node with the change in the version of the application. In one example, executing the application migration component to migrate the application from the first compute node to the second compute node may include deploying a binary file associated with a modified version of the application on the second compute node from the cloud-based MaaS provider, and migrating configuration information associated with the application in the first compute node to the second compute node. Further, deploying the binary file associated with the modified version of the application on the second compute node may include downloading the binary file associated with the modified version of the application in the first compute node, and deploying the binary file in the second compute node. Migration of the application between compute nodes using the cloud-based MaaS is explained in FIGS. 1A and 1B.

Figure 3:
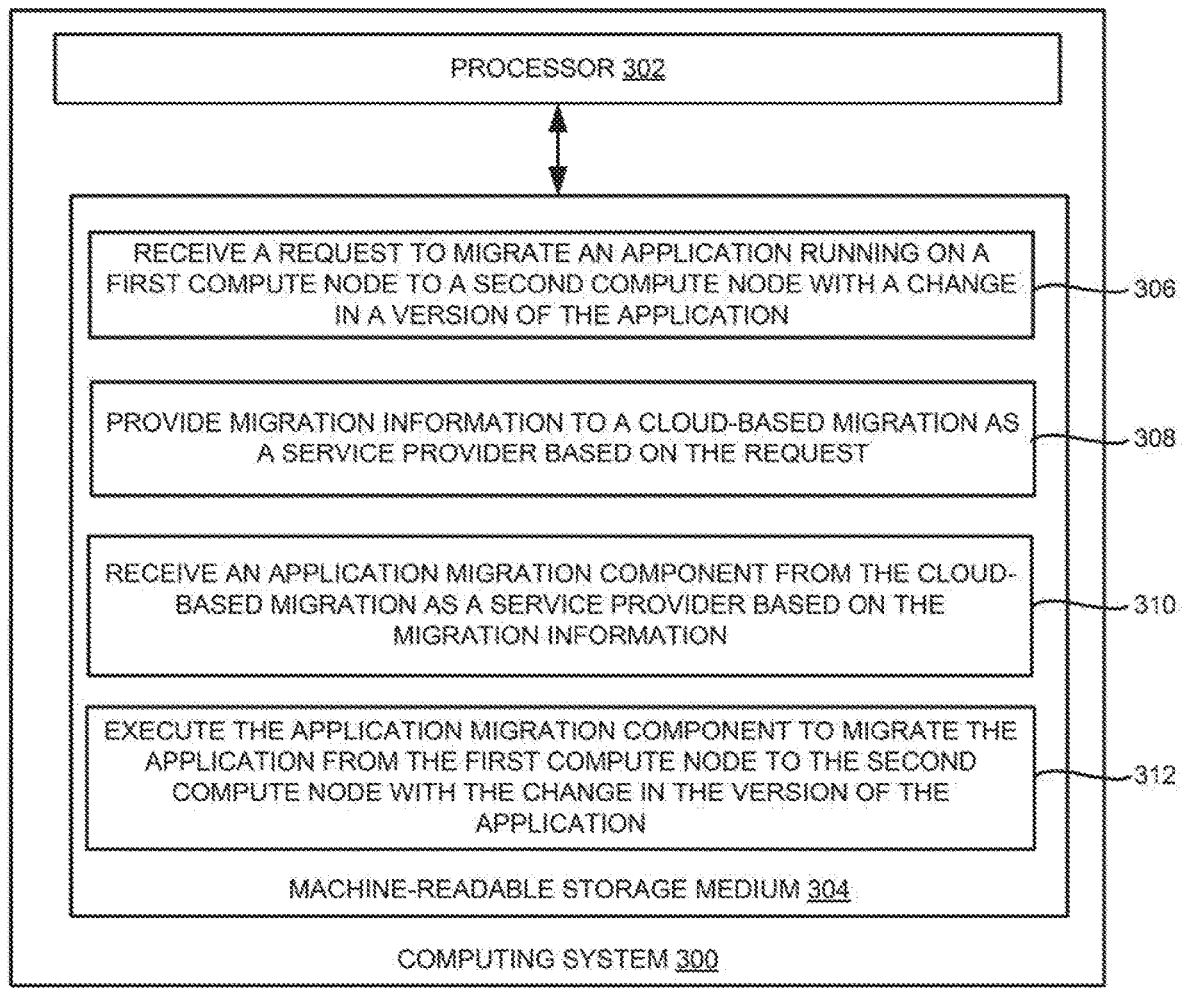
FIG. 3 is a block diagram of an example computing system including a non-transitory computer-readable storage medium, storing instructions to migrate an application between compute nodes using a cloud-based MaaS.

FIG. 3 is a block diagram of an example computing system 300 including non-transitory computer-readable storage medium, storing instructions to migrate applications between compute nodes using the cloud-based MaaS. Computing system 300 may include a processor 302 and a machine-readable storage medium 304 communicatively coupled through a system bus. Processor 302 may be any type of central processing unit (CPU), microprocessor, or processing logic that interprets and executes machine-readable instructions stored in machine-readable storage medium 304. Machine-readable storage medium 304 may be a random-access memory (RAM) or another type of dynamic storage device that may store information and machine-readable instructions that may be executed by processor 302. For example, machine-readable storage medium 304 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, machine-readable storage medium 304 may be a non-transitory machine-readable medium. In an example, machine-readable storage medium 304 may be remote but accessible to computing system 300.

Machine-readable storage medium 304 may store instructions 306-312. In an example, instructions 306-312 may be executed by processor 302 for migrating applications between compute nodes using MaaS. Instructions 306 may be executed by processor 302 to receive a request to migrate an application running on a first compute node to a second compute node with a change in a version of the application. Instructions 308 may be executed by processor 302 to provide migration information to a cloud-based MaaS provider based on the request. Instructions 310 may be executed by processor 302 to receive an application migration component from the cloud-based MaaS provider based on the migration information. Instructions 312 may be executed by processor 302 to execute the application migration component to migrate the application from the first compute node to the second compute node with the change in the version of the application.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques.

Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. A method comprising:
 receiving a request to migrate an application running on a first compute node to a second compute node with a change in a version of the application;
 providing, by a migration orchestrator of the first compute node, migration information to a cloud-based Migration as a Service provider via a network upon receiving the request, wherein the migration information comprises configuration details associated with the first compute node, configuration details associated with the second compute node, and version details of the application;

receiving, by the migration orchestrator, an application migration component as a service from the cloud-based Migration as a Service provider via the network based on the migration information, and executing the application migration component to migrate the application from the first compute node to the second compute node with the change in the version of the application.

2. The method of claim 1, wherein receiving the application migration component from the cloud-based Migration as a Service provider further comprises loading the application migration component on the first compute node prior to executing the application migration component.

3. The method of claim 1, wherein the method is performed as a Migration as a Service.

4. The method of claim 1, Wherein the application. migration component is received from the cloud-based Migration as a Service provider upon validation of the migration. information by the cloud-based Migration as a Service provider.

5. The method of claim 1, wherein the application migration component comprises a system migration component, a data migration component, and a configuration migration component to perform migration of the application from the first compute node to the second compute node with the change in the version of the application.

6. The method of claim 5, wherein executing the application migration component comprises:

downloading, by the system migration component, a binary file associated with a modified version of the application in the first compute node; and deploying, by the system migration component, the binary file in the second compute node.

7. The method of claim 5, wherein executing the application migration component comprises:

migrating, by the configuration migration component, configuration data and custom configuration data associated with a first version of the application to a modified version of the application between the first compute node and the second compute node.

8. The method of claim 5, wherein executing the application migration component comprises:

providing, by the data migration component, seamless migration from a first version to a modified version of the application based on configuration details.

9. The method of claim 1, further comprising;

rolling back migration of the application during failover of the migration.

10. A system comprising:

a cloud-based Migration as a Service provider; and a first compute node communicatively coupled to the cloud-based Migration as a Service provider, wherein the first compute node comprises a migration orchestrator to:

receive a request to migrate an application running on the first compute node to a second compute node with a change in a version of the application;

provide migration information to the cloud-based Migration as a Service provider via a network upon receiving the request, wherein the migration information comprises configuration details associated with the first compute node, configuration details associated with the second compute node, and version details of the application;

receive an application migration component as a service from the cloud-based Migration as a Service provider via the network based on the migration information; and execute the application migration component to migrate the application from the first compute node to the second compute node with the change in the version of the application.

11. The system of claim 10, wherein the application migration component comprises a system migration component, a data migration component, and a configuration migration component to perform migration of the application from the first compute to the second compute node with the change in the version of the application.

12. The system of claim 11, wherein the system migration component is to:

download a binary file associated with a modified version of the application in the first compute node; and deploy the binary file in the second compute node.

13. The system of claim 11, wherein the configuration migration component is to:

migrate configuration data and custom configuration data associated with a first version of the application to a modified version of the application between the first compute node and the second compute node.

14. The system of claim 11, wherein the data migration component is to:

provide seamless migration from a first version to a modified version of the application based on configuration details.

15. The system of claim 1 1, wherein the application migration component comprises a migration rollback component to:

rollback migration of the application during failover of the migration by the migration rollback component.

16. A non-transitory machine-readable storage medium encoded with instructions that, when executed by a processor, cause the processor to:

receive a request to migrate an application running on a first compute node to a second compute node with a change in a version of the application;

provide migration information to a cloud-based Migration as a Service provider via a network upon receiving the request, wherein the migration information comprises configuration details associated with the first compute node, configuration details associated with the second compute node, and version details of the application;

receive an application migration component as a service from the cloud-based Migration as a Service provider via the network based on the migration information; and execute the application migration component to migrate the application from the first compute node to the second compute node with the change in the version of the application.

17. The non-transitory machine-readable storage medium of claim 16, wherein executing the application migration component to migrate the application from the first compute node to the second compute node comprises:

deploying a binary file associated with a modified version of the application on the second compute node from the cloud-based Migration as a Service provider; and migrating configuration information associated with the application in the first compute node to the second compute node.

18. The non-transitory machine-readable storage medium of claim 17, wherein deploying the binary file associated with the modified version of the application on the second compute node comprises:
   downloading the binary file associate with the modified version of the application in the first compute node; and
   deploying the binary file in the second compute node.

19. The non-transitory machine-readable storage medium of claim 16, wherein receiving the application migration component from the cloud-based Migration as a Service provider further comprises loading the application migration component on the first compute node prior to executing the application migration component.

20. The non-transitory machine-readable storage medium of claim 16, wherein executing the application migration component comprises:
   providing seamless migration from a first version to a modified version of the application based on configuration details.

21. The non-transitory machine-readable storage medium of claim 16, further comprising instructions to:
   rollback migration of the application during failover of the migration.

\* \* \* \* \*